United States Patent [19]

Fredericks

[11] Patent Number: 5,060,597
[45] Date of Patent: Oct. 29, 1991

[54] ANIMAL ENCLOSURE BAG

[76] Inventor: Chester P. Fredericks, 3535 W. 72nd Pl., Chicago, Ill. 60629

[21] Appl. No.: 202,707

[22] Filed: Jun. 6, 1988

[51] Int. Cl.$^5$ ............................................. A01K 29/00
[52] U.S. Cl. ...................................... 119/159; 119/160
[58] Field of Search ......................... 119/156, 159, 160

[56] References Cited

U.S. PATENT DOCUMENTS

| | | | |
|---|---|---|---|
| 1,562,318 | 11/1925 | Erlandson | 119/156 |
| 2,408,575 | 10/1946 | Norvig | 119/156 |
| 3,108,568 | 10/1963 | Whitney et al. | 119/160 |
| 3,150,641 | 9/1964 | Kesh | 119/160 |
| 3,596,636 | 8/1971 | Stobaugh | 119/160 X |
| 4,083,328 | 4/1978 | Baker | 119/158 |

FOREIGN PATENT DOCUMENTS 1569519 6/1980 United Kingdom ................ 119/160

Primary Examiner—Paul J. Hirsch
Attorney, Agent, or Firm—Norman B. Rainer

[57] ABSTRACT

An animal enclosure bag is provided to envelope small four-legged animals to facilitate their treatment with aerosol pesticide sprays. The bag is adjustable to fit animals of different sizes. The bag permits more efficient action of the pesticide and greater thoroughness of treatment without contaminating the adjacent environment. The bag is of sufficiently low cost to justify one-time use.

1 Claim, 1 Drawing Sheet

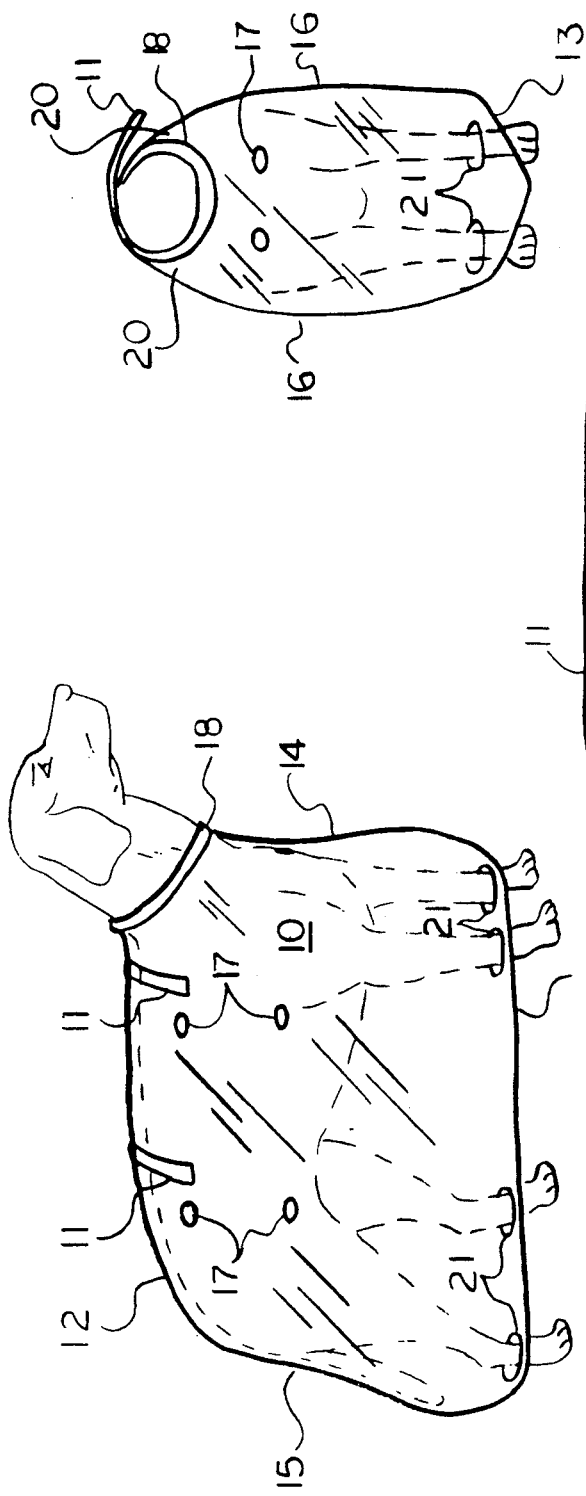

ANIMAL ENCLOSURE BAG

BACKGROUND OF THE INVENTION

This invention relates to the treatment of small animals with chemicals in aerosolized form to kill skin parasites such as fleas and ticks, and more particularly concerns a device for enhancing such treatment.

Killing or otherwise removing fleas and the like from pet and zoo animals, particularly small four-legged hairy or furry animals, has been a problem of long duration. Various insecticidal-type chemical compounds have been found to be effective. However, the specific manner of application of the chemical to the animal is important in terms of effectiveness, safety to the animal, and ease of treatment. Accordingly, chemical preparations in the form of soaps, dusting powders, dipping solutions, slow release collars and aerosol sprays have been developed and used.

Aerosol sprays have found particularly widespread popularity because of their ease of use. However, problems of overspray occur with resultant contamination of the environment adjacent the area where the animal is being treated. When the aerosol stream is held closer to the animal to avoid overspray, excessive and potentially harmful concentrations may be applied to localized areas of the animal, and certain areas of the animal may be missed entirely.

Recognizing the aforesaid problems in using aerosol sprays, animal enclosure bags have been proposed and used, such as the one disclosed in U.S. Pat. No. 4,144,845. The bags prevent evaporative dissipation of the volatile insecticide chemicals away from the animal's coat, thereby retaining effective concentration of the chemicals for longer periods of time. Also, the confined retention of the volatile chemicals promotes their even diffusion throughout the animal's coat, thereby ensuring thorough treatment of the animal.

The bag of U.S. Pat. No. 4,144,845 is of relatively expensive construction, and is intended to be re-used repeatedly. Such re-use, however, entails difficult cleaning and sterilization procedures to ensure that the bag is not contaminated with viable eggs or larvae forms of insects.

It is accordingly an object of the present invention to provide an animal enclosure bag of sufficiently low cost to be economically discardible following a single use.

It is another object of this invention to provide an animal enclosure bag as in the foregoing object-amenable to use in conjunction with aerosolized pesticide chemicals.

It is a further object of the present invention to provide an enclosure bag of the aforesaid nature having sufficient adjustability to accommodate animals of different sizes.

These objects and other objects and advantages of the invention will be apparent from the following description.

SUMMARY OF THE INVENTION

The above and other beneficial objects and advantages are accomplished in accordance with the present invention by an enclosure bag fabricated of impervious flexible sheet material and comprising:

a) a body portion having upper, lower, front and rear extremities, and several spaced apart aerosol-receiving apertures, b) a bottom portion emergent from said lower extremity as a continuous extension thereof, and having four leg-receiving holes positioned in a rectangular array, c) a head-accommodating opening adjacent the front extremity, d) a closeable elongated opening running the length of said upper extremity and defining two interactive opposed flap-like portions, and e) strips of contact or adhesive tape associated with said flap-like portions and adapted to permit adjustably overlapping interengagement of said flap-like portions to close said elongated opening and cause the bag to closely fit the animal.

In preferred embodiments, the bag is of substantially monolithic structure, having been fabricated of a single piece of thin thermoplastic film. The film is preferably transparent. The bottom portion preferably sags downwardly in its central region between the leg-receiving holes. The sagging region functions to collect and hold urine resulting from certain animals under stressful conditions.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a side view of an embodiment of the enclosure bag of this invention shown functionally positioned upon a dog.

FIG. 2 is a front view of the embodiment of FIG. 1.

FIG. 3 is a top view of the bag of FIG. 1.

DESCRIPTION OF THE PREFERRED EMBODIMENT

Referring to FIGS. 1-3, an embodiment of the animal enclosure bag of the present invention is shown comprised of body portion 10 and strips of contact or pressure-sensitive adhesive tape 11.

Body portion 10 may be characterized in having upper, lower, front, rear and side extremities 12, 13, 14, 15 and 16 respectively. Several apertures 17 are spaced about the body portion. Lower extremity 13 is essentially a bottom portion that sags in its central region, and contains four leg-receiving holes 21 which can accommodate the legs of the animal.

A head-accommodating opening 18 is disposed adjacent front extremity 14 of the body portion. A closeable elongated opening 19 traverses the length of the upper extremity of the bag between front and rear extremities and communicates with head opening 18. Said elongated opening defines two opposed flap-like portions 20.

Said strips of contact adhesive tape 11 are disposed in a manner to bridge flap portions 20.

In use, the animal is placed in the bag, permitting the head to engage through opening 18. Flaps portions 20 are then raised and overlapped upon one another to an extent which positions the sagging center of bottom portion 13 to be above ground level. The adhesive tape is then utilized to secure the position of the flaps with attendant sealing of the upper portion of the bag. Because head opening 18 communicates with elongated opening 19, an adjustable snug fit is secured around the neck of the animal while simultaneously adjusting the height of the bag. An aerosol spray may then be dispensed through apertures 17. Following such use, the bag is removed and discarded. The bags may be marketed in a flattened state and preferably disposed within a roll-form dispenser package.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. An animal enclosure bag fabricated of impervious flexible transparent sheet material and comprising:
 a) a body portion having upper, lower, front and rear extremities, and several spaced apart aerosol-receiving apertures,
 b) a bottom portion emergent from said lower extremity as a continuous extension thereof, having four leg-receiving holes positioned in a rectangular array, and sagging downwardly in the central region between said leg-receiving holes,
 c) a head-accommodating opening adjacent the front extremity,
 d) a closeable elongated opening running the length of said upper extremity, defining two interactive opposed flap-like portions, and communicating with said head-accommodating opening, and
 e) strips of contact adhesive associated with said flap-like portions and adapted to permit adjustably overlapping interengagement of said flap-like portions to close said elongated opening with attendant securement of a snug fit around the neck of the animal and adjustment of the height of the bag upon the animal.

* * * * *